United States Patent
Muller

[11] Patent Number: 5,961,124
[45] Date of Patent: Oct. 5, 1999

[54] SEALING SYSTEM FOR A VERTICALLY DISPOSED SHAFT

[75] Inventor: Heinz K. Muller, Waibligen, Germany

[73] Assignee: Leybold Aktiengesellschaft, Germany

[21] Appl. No.: 08/836,541

[22] PCT Filed: Aug. 25, 1995

[86] PCT No.: PCT/EP95/03364

§ 371 Date: Apr. 28, 1997

§ 102(e) Date: Apr. 28, 1997

[87] PCT Pub. No.: WO96/13678

PCT Pub. Date: May 9, 1996

[30] Foreign Application Priority Data

Oct. 31, 1994 [DE] Germany .............................. 44 38 878

[51] Int. Cl.[6] .................................................. F16J 15/447
[52] U.S. Cl. ........................ 277/350; 277/351; 277/411
[58] Field of Search .................................... 277/350, 351, 277/418, 419, 421, 411, 570

[56] References Cited

U.S. PATENT DOCUMENTS

| 1,562,019 | 11/1925 | Wilkinson | 277/419 X |
|---|---|---|---|
| 3,246,901 | 4/1966 | Wickli . | |
| 3,343,891 | 9/1967 | Shipman | 277/418 X |
| 3,700,247 | 10/1972 | Butler et al. . | |
| 3,880,434 | 4/1975 | Echard et al. | 277/418 X |
| 3,912,284 | 10/1975 | Gosling et al. | 277/351 |
| 4,260,167 | 4/1981 | Fox . | |
| 4,664,392 | 5/1987 | Hatch | 277/570 X |
| 5,201,529 | 4/1993 | Heinzen | 277/351 |
| 5,326,111 | 7/1994 | Hatch | 277/570 X |

FOREIGN PATENT DOCUMENTS

| 937501 | 1/1956 | Germany . |
|---|---|---|
| 1102506 | 10/1961 | Germany . |
| 2138362 | 3/1972 | Germany . |
| 2159136 | 6/1972 | Germany . |
| 2906826 | 9/1979 | Germany . |
| 4233142 | 4/1994 | Germany . |
| 2363661 | 7/1994 | Germany . |
| 547455 | 3/1974 | Switzerland . |
| 803306 | 10/1958 | United Kingdom . |
| 8402382 | 6/1984 | WIPO . |

Primary Examiner—Lynne Reichard
Assistant Examiner—David E. Bochna
Attorney, Agent, or Firm—Wall Marjama Bilinski & Burr

[57] ABSTRACT

A sealing system for an essentially vertical shaft includes an active sealing element disposed between a first structural part rotating with the shaft and a second structural part stationary on a housing. A wall of the housing separates an upper oil-free volume from a lower volume containing oil. The oil flows through the sealing system through a gap formed by the first structural part and a third structural part stationary on the housing. The active sealing element is preferably a threaded shaft seal. In another embodiment, the active sealing element is a combination of a primary contact seal and a threaded shaft seal. The oil flow removes heat generated by the rotating system.

9 Claims, 2 Drawing Sheets

SEALING SYSTEM FOR A VERTICALLY DISPOSED SHAFT

BACKGROUND OF THE INVENTION

The invention relates to a sealing system disposed in the aperture through a housing wall, for an essentially vertical shaft with an active sealing element which is disposed between a structural part rotating with the shaft and a structural part stationary on a housing, with the housing wall separating an upper, oil-free volume from a lower oil-containing volume.

Sealing systems of this type are used for example in a vacuum pump such as is described in DE-A-42 33 142. In the case of vacuum pumps of this type the elimination of the heat generated in the rotating system presents problems. It develops, for one, due to the compression work of the rotors in their suction chambers and, for another, through the heat due to friction of the contact seals (radial shaft sealing) used.

SUMMARY OF THE INVENTION

The present invention addresses the problem of creating a sealing system of the above cited type in which the elimination of heat is significantly improved.

This problem is solved according to the invention thereby that through the sealing system flows oil and that the structural part rotating with the shaft as well as a further structural part stationary on the housing form a gap through which the oil flows. The oil flowing through this gap absorbs, for one, heat from the structural part rotating with the shaft and eliminates it. For another, the oil establishes a heat contact between the rotating structural part and the structural part stationary on the housing so that via the structural part stationary on the housing, and thus via the housing, the heat is eliminated.

The structural part and the further structural part stationary on the housing are usefully realized in the form of a labyrinth in their regions facing one another for the purpose of extending the gap through which the oil flows. The cooling effect is thereby enhanced. In addition, a long gap of this type has the effect of a choke. This maintains excess pressure and thus continuous flooding without bubble formation at the oil inlet.

The active sealing element can be a contact sealing (shaft seal, collar sealing or the like) or a threaded shaft seal. Especially useful is a combination comprising a primary contact seal and a second threaded shaft seal as auxiliary sealing.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
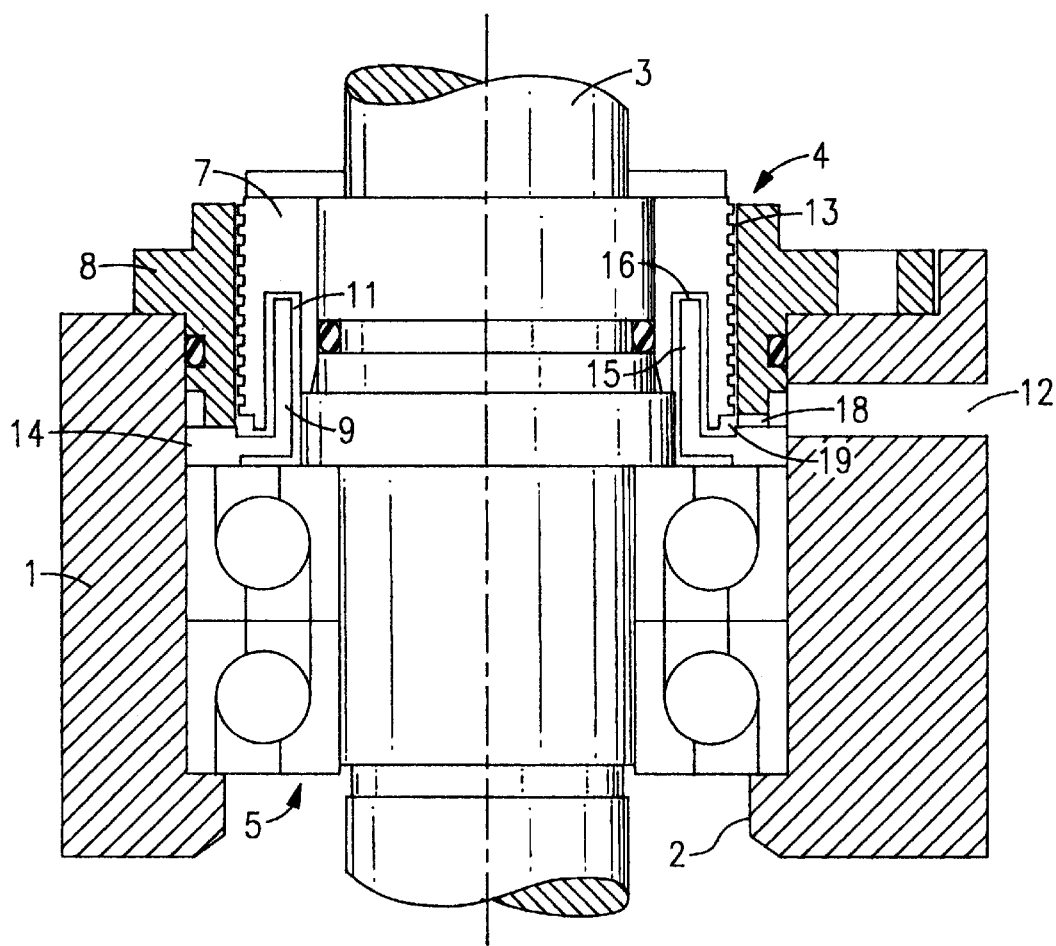
FIG. 1 shows a sectional view of a sealing system with a threaded shaft seal according to an embodiment of the invention.

In all Figures the housing wall is denoted by 1, an aperture provided in the housing wall 1 by 2, a vertical shaft penetrating the aperture 2 by 3, and a sealing system sealing the shaft 3 against the aperture 2 in general by 4. The housing wall 1 separates for example in vacuum pumps an upper oil-free volume (suction chamber with low pressures, vacuum) from a lower oil-containing volume (gearing chamber, in which pressures exceeding the atmospheric pressure can occur). In the embodiment examples depicted the shaft 3 is supported in the aperture 2. Bearings disposed underneath the sealing system 4 are denoted by 5.

The sealing system 4 comprises a structural part 7 rotating with the shaft. Furthermore, two structural parts 8 and 9 stationary on the housing are present. The first structural part 8 (sealing structural part 8) encompasses the rotating structural part 7. The second structural part 9 stationary on the housing forms together with the rotating structural part 7 a gap 11 through which flows oil. The supply of the oil, preferably PFPE oil, which is under slight excess pressure, takes place via a bore 12 in the housing wall 1. Subsequently, as will be explained later in further detail, it flows through the gap 11 and arrives through the bearing 5 in the oil-containing volume disposed underneath the bearing 5.

In the embodiment example according to FIG. 1 the rotating structural part 7 and the sealing structural part 8 stationary on the housing form a threaded shaft sealing 13. The threads disposed on the rotating structural part 7 are implemented such that with the shaft rotating oil penetrating from below into threaded shaft seal 13 is again transported downwardly (recirculating threads). The oil rises at a given pressure difference in the recirculating threads until an equilibrium is reached between the pressure difference to be sealed off and the recirculating pressure of the threads. The variable level of fill must remain less than the geometrically available axial length of the recirculating threads.

The second structural part 9 stationary on the housing (gap-forming structural part 9) comprises a flange-form edge 14 extending below the structural part 8 and a cylindrical segment 15 extending upwardly at the level of the rotating structural part 7. This segment 15 extends free of contact into an annular groove 16, open in the downward direction, in the rotating structural part 7, and specifically such that the gap 11 is formed.

During operation of a machine with a sealing system 4 according to FIG. 1 the oil flows from the bore 12 through radial slots 18 into an annular volume 19 in which the recirculating threaded gap 13 as well as also gap 11 terminate from above. Oil reaching the threaded gap 13 is continuously carried back in order to ensure the desired sealing. The oil can therefore only flow out of the annular volume 9 through gap 11, thus moving between the rotating structural part 7 and the cylinder segment 15 initially upwardly and subsequently again downwardly. In this way it fulfills the task of absorbing heat from the rotating structural part in order to eliminate the heat itself or to transfer it to the structural part stationary on the housing. The width of the gap is usefully smaller than 1 mm, preferably 0.3 mm.

Figure 1A:
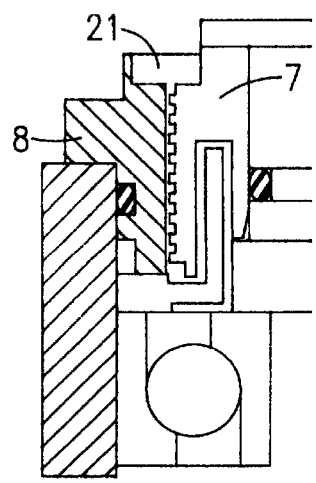
FIG. 1a shows a sectional view of a sealing system with a threaded shaft seal according to a variation of the embodiment of FIG. 1.

In the case of using the solution according to FIG. 1 in a vacuum pump, the following must be considered: if the pump is stored while it is still warm from operation (for example at 80° C. and thus at a gearing volume pressure, generated by thermal expansion, of approximately 1.3 bars), the recirculating pressure of the threaded shaft seal 13 diminishes instantaneously. Consequently the persisting gearing volume pressure will force the oil contained in the threaded gap upwardly into the delivery volume of the pump. In order to solve this problem, it is suggested to provide an expanded annular volume 21 above the recirculating thread 13 (depicted in FIG. 1a) in which in the described case the oil can be collected without penetrating in fact into the pump volume. When the pump is started again, the threads immediately return the oil in the expanded annular volume 21 unless the oil has returned by itself after a relatively long standstill in connection with the cooling of the gearing volume.

Figure 2:
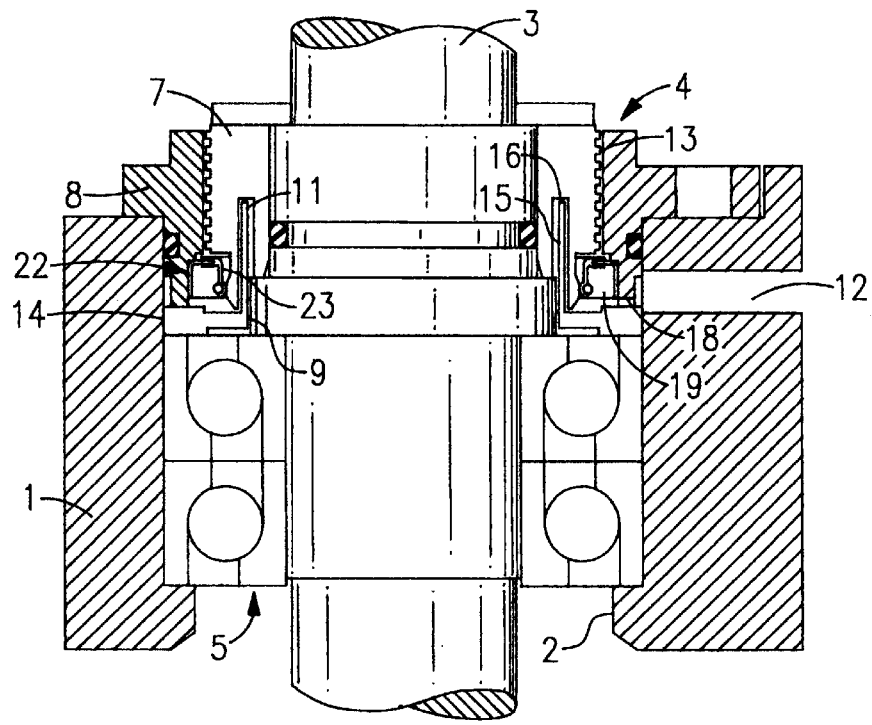
FIG. 2 shows a sectional view of a sealing system with a threaded shaft seal according to an embodiment of the invention.

In the embodiment example according to FIG. 2, in addition to the threaded shaft seal 13, a contact seal is provided and specifically a radial shaft sealing ring 22 (RSSR 22). It is disposed in the annular volume 19, and specifically underneath the threaded shaft seal 13. Its disposition is selected such that its sealing lip 23 together with the rotating structural part 7 forms an—internally located—sealing site. The open side of the sealing ring 22 faces the oil-containing volume. The spacing of the sealing site from the gap 11 through which oil flows is as small as possible so that an effective cooling of the sealing site is achieved. In this embodiment example, RSSR 22 initially seals off the oil in conventional manner. In order to attain optimum service life of the RSSR 22, a low specific radial force, preferably less than 0.15 N/mm, should be ensured. For this purpose the RSSR 22 can be installed without a spring. In contrast to conventional configurations, the RSSR 22 runs on a thin-walled tubular extension of the rotating structural part 7. This allows for the contacting sealing site to be cooled especially strongly from the inside and from the outside. Due to the low radial force, on the one hand, and the cooling of the sealing site, on the other hand, a considerable increase of the service life of the RSSR 22 can be expected in contrast to conventional dispositions of RSSR.

As soon as a leak occurs on RSSR 22 which goes beyond the holding capacity of the annular volume 19 above the RSSR 22, the recirculating threads 13 become active. The higher the oil rises with further leakage in the recirculating threads 13, the higher becomes the liquid pressure generated by the threads on the topside of the RSSR 22. Thereby the RSSR 22 becomes increasingly free of loading and finally runs nearly free of friction. Nevertheless, when the pump is taken out of operation, if the pressure of the threads diminishes, the RSSR 22 seals the gap again completely so that no oil can be pushed through in the upward direction though the excess pressure in the gearing volume. An oil collection volume 21, as was described in connection with the solution according to FIG. 1, can thus be omitted. During the next start, the threads immediately transport the oil in the downward direction. In the process, the RSSR 22 is lubricated from above and simultaneously the load is removed. If, in the pump which in the meantime has cooled, the pressure in the gearing volume is still relatively low, the RSSR, impressed from above, can allow oil to penetrate downwardly whereby the recirculating threads can potentially become partially or completely pumped empty. In addition, during the start, the RSSR 22 prevents that oil adhering on the sealing gap walls from being suctioned upwardly into the delivery volume of the pump.

Figure 3:
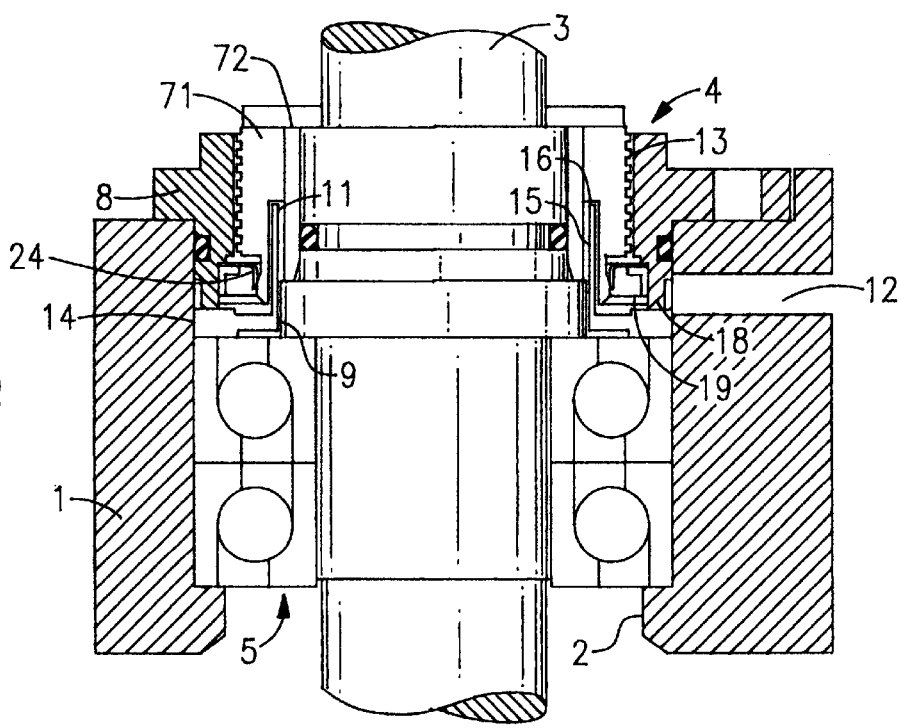
FIG. 3 shows a sectional view of a sealing system with a threaded shaft seal according to an embodiment of the invention.

In the embodiment example according to FIG. 3 a PTFE collar seal (PTFE collar 24) is provided as a primary contact seal. An advantage of this primary seal, compared to the RSSR 22 according to FIG. 2, is the greater pressure bearing capability and thermal stability of the PTFE shaft sealing ring. For the remainder the configuration and the functions of this solution correspond to the solution according to FIG. 2.

As described, the sealing system 4 comprises a rotating structural part 7 and two structural parts 8 and 9 stationary on the housing. These could each comprise several parts or be an integral component of the shaft 3 or the housing wall 1. In the last case, however, their fabrication is difficult. This applies in particular to the rotating structural part 7. In the embodiment according to FIG. 3, due to annular groove 16 which could otherwise only be produced with difficulty, rotational structual parts comprises two essentially cylindrical parts 71, 72 which are connected by means of shrink-fitting or hard-soldering and which form the annular groove 16 between them.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sealing system for use in a vacuum pump equipped with a vertical shaft, said sealing system comprising:
   a stationary housing;
   a vertically disposed shaft mounted for rotation within said housing;
   a seal means connected to said shaft for rotation with the shaft within said housing, said seal means having a top and a bottom surface, said seal means includes a rotating threaded shaft seal having an outer surface, said outer surface adjacent an inner surface of said housing and forming a first space;
   a cylindrical groove within said seal means extending upward from the bottom surface; and
   a cylindrical segment disposed within said groove to provide a gap between adjacent surfaces of the groove and the segment which creates a flow path, whereby cooling oil can be conducted through said flow path, said cylindrical segment being connected to said housing.

2. The sealing system of claim 1, including an expanded annular volume disposed adjacently above said first space.

3. The sealing system of claim 1, wherein said first space is in communication with said gap through an annular volume, said oil being able to flow into said gap, into said annular volume, and into said first space.

4. The sealing system of claim 1, including a second seal, said second seal being a radial shaft sealing ring disposed below said rotating shaft seal.

5. The sealing system of claim 1, wherein said oil is introduced into a lower portion of said first space for an upward directional flow, and wherein said rotating threaded shaft seal provides a recirculating pressure that transports said oil back into a downward directional flow as said oil rises through said seal.

6. The sealing system of claim 1, including a second seal, said second seal being a collar seal disposed below said rotating shaft seal.

7. The sealing system of claim 1, including a second seal, said second seal being a contact seal.

8. The sealing system of claim 7, wherein said contact seal is disposed in an annular volume below said rotating threaded seal, and wherein said contact seal separates the lower entrance of the first space with the entrance of the gap.

9. The sealing system of claim 7, wherein said contact seal has a low specific radial force.

* * * * *